US012771395B2

(12) United States Patent
Jones et al.

(10) Patent No.: US 12,771,395 B2
(45) Date of Patent: Oct. 20, 2026

(54) VEST WORN COMMUNICATION CONTROL HUB

(71) Applicant: Atlantic Signal, LLC

(72) Inventors: Eric Ryan Jones, Topeka, KS (US); David John Bondarenko, Topeka, KS (US); Cody Michael Stallbaumer, Topeka, KS (US); Tyler John McClellan, Topeka, KS (US)

(73) Assignee: Atlantic Signal, LLC

( * ) Notice: Subject to any disclaimer, the term of this patent is extended or adjusted under 35 U.S.C. 154(b) by 635 days.

(21) Appl. No.: 17/930,368

(22) Filed: Sep. 7, 2022

(65) Prior Publication Data

US 2023/0073517 A1 Mar. 9, 2023

Related U.S. Application Data

(60) Provisional application No. 63/241,882, filed on Sep. 8, 2021.

(51) Int. Cl.

*H04B 1/3827* (2015.01)
*A41D 1/00* (2018.01)
*H04R 1/10* (2026.01)
*H04R 3/12* (2006.01)

(52) U.S. Cl.

CPC ........... *H04B 1/385* (2013.01); *H04R 1/1033* (2013.01); *H04R 3/12* (2013.01); *A41D 1/002* (2013.01); *H04B 2001/3855* (2013.01)

(58) Field of Classification Search

CPC ............ H04B 1/385; H04B 2001/3855; H04R 1/1033; H04R 3/12; H04R 2201/023; A41D 1/002; A45F 5/1508; A45F 5/1516; A45F 2003/146

See application file for complete search history.

(56) References Cited

U.S. PATENT DOCUMENTS 5,850,613 A 12/1998 Bullecks
10,469,120 B1 * 11/2019 Cetinoneri ............... H04B 1/18
2001/0050991 A1 * 12/2001 Eves ....................... H04M 1/05 381/11
2004/0140898 A1 7/2004 Reeves
(Continued)

FOREIGN PATENT DOCUMENTS

AU 2006200486 A1 * 8/2007
CN 104170403 A * 11/2014 ........... H04R 1/1041
(Continued)

OTHER PUBLICATIONS https://atlanticsignal.com/products/anaconda-programmable-maritime-push-to-talk/; Admitted prior art, on sale prior to Sep. 7, 2020.
(Continued)

*Primary Examiner* — Matthew D. Anderson
(74) *Attorney, Agent, or Firm* — AVEK IP, LLC; Kent R. Erickson

(57) ABSTRACT

A tactical vest worn communication control hub has cables extending to transceivers, a headset, and PTT switches. The cables are operationally interconnected within the hub by a circuit board to enable the switches to control operation of the transceivers to receive and transmit and to convey audio signals to and from the headset. The hub is configured to be removably attached to the rear of the vest.

19 Claims, 7 Drawing Sheets

(56) References Cited

U.S. PATENT DOCUMENTS

| | | | |
|---|---|---|---|
| 2008/0004089 | A1 | 1/2008 | Huizer et al. |
| 2008/0110946 | A1* | 5/2008 | Dixon ................. B60R 11/0241 224/197 |
| 2008/0267440 | A1 | 10/2008 | Alden |
| 2009/0107163 | A1* | 4/2009 | Lu ........................... F25D 17/06 62/291 |
| 2010/0100997 | A1* | 4/2010 | Lee .................... H01R 13/2407 428/156 |
| 2017/0195770 | A1* | 7/2017 | Cheney ................ H04R 1/1016 |
| 2017/0195773 | A1* | 7/2017 | Morris ................. H04R 1/1016 |
| 2018/0366867 | A1* | 12/2018 | Wolf .................... H02G 15/196 |
| 2019/0355239 | A1* | 11/2019 | Brinkley .............. G08B 29/046 |
| 2021/0226599 | A1 | 7/2021 | Hudson et al. |
| 2021/0235234 | A1 | 7/2021 | Hoang et al. |
| 2022/0006892 | A1* | 1/2022 | Perkins .................... H01Q 5/25 |
| 2023/0035253 | A1* | 2/2023 | Girton .................... A62B 18/08 |

FOREIGN PATENT DOCUMENTS

| | | | |
|---|---|---|---|
| CN | 110793395 | A * | 11/2019 |
| DE | 10058478 | B4 * | 11/2000 |
| KR | 101337538 | B1 | 12/2013 |

OTHER PUBLICATIONS https://atlanticsignal.com/products/shield-push-to-talk/; Admitted prior art, on sale prior to Sep. 7, 2020.

https://atlanticsignal.com/products/viper-ii-push-to-talk-for-dual-band-radios/; Admitted prior art, on sale prior to Sep. 7, 2020.

https://atlanticsignal.com/products/invictus-ss-dual-comm-push-to-talk/; Admitted prior art, on sale prior to Sep. 7, 2020.

* cited by examiner

VEST WORN COMMUNICATION CONTROL HUB

This application claims the benefit to U.S. Provisional Patent Application Ser. No. 63/241,882, filed Sep. 8, 2021, the disclosure of which is incorporated by reference herein.

BACKGROUND OF THE INVENTION

Field of the Invention

This invention relates to body worn communication equipment and, more particularly, to a vest worn unit for interconnecting a headset and push-to-talk (PTT) switches with one or more portable radio transceivers.

Description of Related Art

Technology used to protect tactical individuals from bullets, shrapnel, and other projectiles includes body armor that is positioned and held in place on the torso via a vest. The vest was commonly known as an LBE (Load Bearing Equipment) vest. Internally the LBE vest had pockets in the front and back to hold protective armor. The vest generally covered the entire upper torso front and back, neck, shoulders, upper arms, and groin. These vests included either snaps or Velcro-type material (Velcro IP Holdings, LLC) positioned at strategic areas on the vest to allow the wearer to attach operational equipment such cloth/nylon carriers for ammunition magazines, radio(s), communication push-to-talk switches, a canteen, and the like. Many vests also employed small loops located on the front for devices utilizing alligator-style clips to easily attach to the vest. These vests tended to be bulky, heavy, and hot, but generally un-cluttered by operational equipment that required vest mounting since, at the time, such equipment was limited in scope.

As tactical operations have evolved to include more urban settings, in addition to battlefields, deserts, and the like, operational equipment supported on vests has similarly changed. Ballistic protection on the vests has been reduced to vital areas while more complex radios, which may include narrowband and wideband capabilities, and tablet computers or tablets have been provided for graphic data, such as mapping, networking, and the like. Such communication equipment is supported on the vest, along with more traditional operational equipment, such as ammunition magazines and the like.

The types of attachment structures for more current vests may include MOLLE (Modular Lightweight Load carrying Equipment) or PALS (Pouch Attachment Ladder System) strips which are rows and columns or "ladders" of webbing, elastic fabric strips, or the like stitched to the vests.

The radios provided may be multiband, multimode, and multichannel handheld transceivers of a type which can be used without an external microphone or headphone, with a speaker-microphone (speaker-mike) with a push-to-talk (PTT) switch, or with a headset (headphone plus microphone) and a PTT switch. Functionally, when the PTT switch is not operated, the receiver of the transceiver may be active to convey an audio signal to the headphones of a headset. When the PTT switch is operated, the receiver is muted, the microphone of the headset is enabled, and the transmitter of the transceiver is activated to transmit a radio signal modulated by vocal input through the microphone. The PTT switch, or switches if multiple radios are used, may be separated from the headset and combined as a PTT switch unit which is releasably attached to the front of the tactical vest. As the amount of equipment supported on the front of the vests has increased, space to mount and effectively operate communication controls, such as push-to-talk switch units for the radios, has been reduced or effectively eliminated.

SUMMARY OF THE INVENTION

The present invention provides embodiments of a vest worn or vest supported communications control hub for interconnecting one or more portable radio transceivers with a headset and operational controls.

Exemplary embodiments of the present invention provide a body worn communications interconnection hub apparatus for interconnecting a body worn push-to-talk switch, headset, and portable radio transceiver and comprising: a hub housing; a headset cable extending from the housing and having respective conductors therein, the headset cable terminating in a headset cable connector; a push-to-talk cable extending from the housing and having respective conductors therein, the push-to-talk cable terminating in a push-to-talk cable connector; a transceiver cable extending from the housing and having respective conductors therein, the transceiver cable terminating in a transceiver cable connector; and a hub interconnection circuit having the respective conductors of the headset cable, the push-to-talk cable, and the transceiver cable connected thereto, the hub interconnection circuit being configured to interconnect conductors of the push-to-talk, headset, and transceiver cables in such a manner that operation of a push-to-talk switch connected to the push-to-talk cable connector causes cooperation of a headset connected to the headset cable connector with a transceiver connected to the transceiver cable connector to transmit and receive radio communications by way of the transceiver.

Another embodiment of the hub apparatus provides a hub housing; a headset cable extending from the housing and having headset conductors therein, the headset cable terminating in a headset cable connector having the headset conductors connected thereto; a push-to-talk cable extending from the housing and having sets of push-to-talk conductors therein which are associated respectively with a pair of transceivers, the push-to-talk cable terminating in a push-to-talk cable connector having the push-to-talk conductors connected thereto, the push-to-talk cable connector being configured to enable at least a pair of push-to-talk switches to be connected thereto which are associated respectively with a pair of transceivers; a pair of transceiver cables extending from the housing, each of the transceiver cables having transceiver conductors therein which are associated with one of a pair of transceivers, each of the transceiver cables terminating in a respective transceiver cable connector having the associated transceiver conductors connected thereto; and a hub interconnection circuit having the conductors of the headset cable, the push-to-talk cable, and the transceiver cables connected thereto, the hub interconnection circuit being configured to interconnect conductors of the push-to-talk, headset, and transceiver cables in such a manner that operation of a push-to-talk switch connected to the push-to-talk cable connector causes cooperation of a headset connected to the headset cable connector with a transceiver connected to a transceiver cable connector associated with the push-to-talk switch operated to thereby transmit and receive radio communications by way of the respective transceiver.

In an embodiment of the hub apparatus the housing may include a strain relief structure surrounding each of the cables where the cables exit the housing. The housing may also include a surface feature, such as a notch or relief, formed in a surface thereof to enable secure removable mounting of the housing on existing attachment structure of a tactical vest. An embodiment of the hub apparatus is combined with a tactical vest having a rear panel with an existing attachment structure thereon, and the housing is removably attached to existing attachment structure on the rear panel of the vest.

Some of the cables may include respective adapter cables or adapters to adapt the cables extending from the hub housing to particular connector requirements of the push-to-talk switches, headset, or transceivers employed. The cables, either with or without adapter cables, are of sufficient lengths to enable positioning the terminal connectors thereof remote from the hub housing to enable access by the vest wearer to the terminating connectors thereof.

In an embodiment of the hub apparatus, the housing includes a molded hub body having the hub interconnection circuit, proximal ends of the push-to-talk, headset, and transceiver cables, and connections of conductors of the cables to the circuit sealingly molded therein. The hub body may be formed of an electrically nonconductive polymer which is resilient enough that the strain relief structures are sufficiently pliable to reduce bending stresses on the cables extending from the hub body.

Various objects and advantages of the present invention will become apparent from the following description taken in conjunction with the accompanying drawings wherein are set forth, by way of illustration and example, certain exemplary embodiments.

The drawings constitute a part of this specification, include exemplary embodiments, and illustrate various objects and features thereof.

DETAILED DESCRIPTION OF PREFERRED EMBODIMENTS

Figure 1:
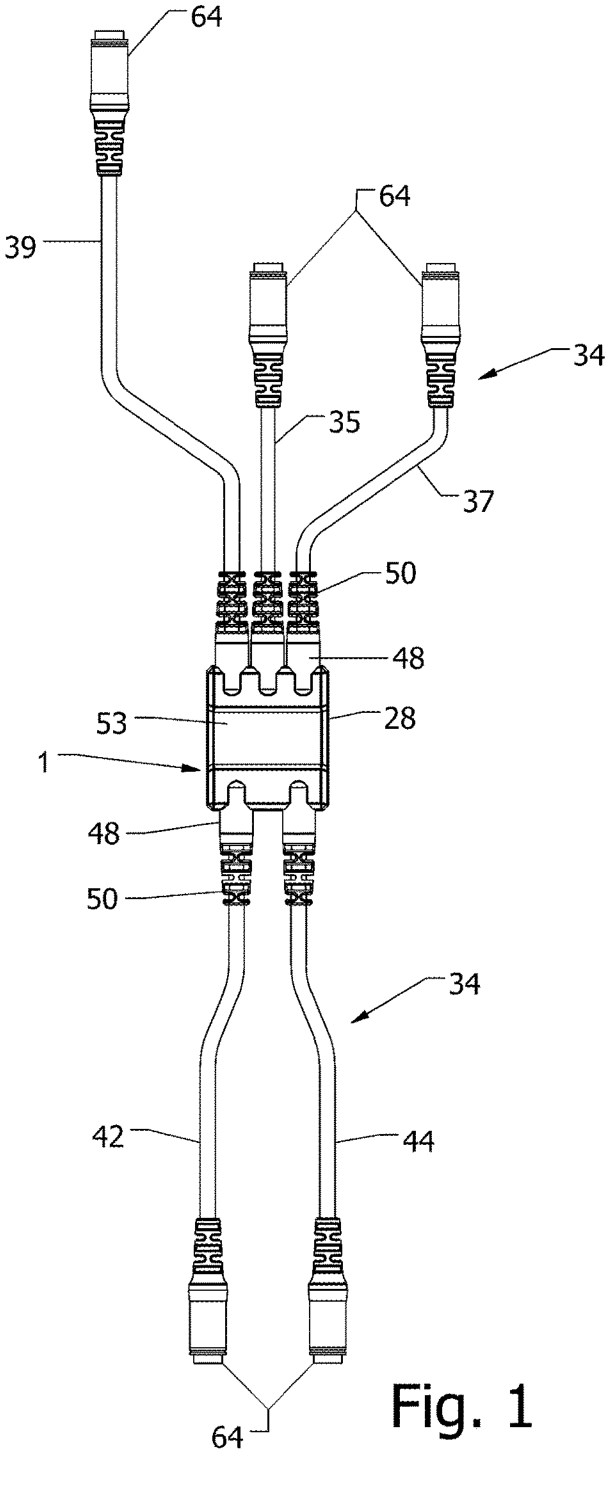
FIG. 1 is a rear elevational view of an embodiment of a vest worn communications control hub apparatus according to the present invention.

As required, detailed exemplary embodiments are disclosed herein; however, it is to be understood that the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ exemplary embodiments in virtually any appropriately detailed structure.

Referring to the drawings in more detail, the reference number 1 generally designates an embodiment of a vest worn communications control hub apparatus according to the present invention which may also be referred to as a communications hub or communications hub apparatus 1. Generally, the hub apparatus or hub 1 operationally interconnects communications equipment which may include a headset 3 (FIG. 5), push-to-talk (PTT) switch units or paddles 5 and 6 with a pair of portable radio transceivers (XCVR's) 9 and 10. The hub 1 is supported on a rear side of the a tactical vest 12 while the PTT switch units 5 and 6 are supported on a front side thereof. The illustrated transceivers 9 and 10 are supported on left and right lateral sides of the vest 12.

The illustrated tactical vest 12 may include a front panel 15 (FIG. 5) and a rear panel 16 (FIG. 6) which may be connected by shoulder straps 17 and by side panels, adjustable side straps, or the like (not shown). The vest 12 may have various pockets or pouches (not shown) to receive body armor plates (not shown) at positions of the vest to protect vital areas of the wearer. The vest 12 may also include a pouch or pouches 18 (FIG. 5) on the front panel 15 to store operational equipment such as ammunition magazines and the like. The illustrated vest 12 has a pair of side pockets 20 and 21 (FIGS. 5 and 6) on the sides thereof to receive the transceivers 9 and 10 respectively therein. The vest 12 may have various attachment structures thereon to carry a variety of equipment. The illustrated vest 12 has an array of attachment strips 24 on the rear panel 16 thereof, such as MOLLE strips. As described above, MOLLE strips are strips of webbing or fabric, which may be elastic, which may be stitched, riveted, or otherwise attached to the vest 12 to support various types of operational equipment on the vest. As will be described further below, attachment strips 24 on the rear panel 16 of the vest 12 may be used to support the hub apparatus 1. The vest 12 may also have such attachment strips 24 positioned on the front panel 15.

Referring to FIGS. 1-4, an embodiment of the hub apparatus 1 includes a hub housing or body 28 having a plurality of cables 34 extending from an upper end 30 and a lower end 32 thereof. On the illustrated hub apparatus 1, a push-to-talk switch cable or PTT cable 35 and a headset cable 37 extend from the upper end 30 of the hub body 28. The upper end 30 may also have an intercom cable 39 extending therefrom. At the lower end 32, a pair of transceiver cables 42 and 44 extend from the hub body 28. The illustrated hub body 28 has reinforcement cylinders 48 extending from the upper and lower ends 30 and 32 which have the cables 35, 37, 39, 42, and 44 extending therethrough. The cylinders 48 frictionally grip the cables 34 and prevent them from being easily pulled out of the hub body 28. Each of the cylinders 48 may terminate in a strain relief structure or strain relief 50 which surrounds the respective cable 34. While the reinforcement cylinders 48 are relatively rigid, the strain reliefs 50 have some flexibility and reduce bending stresses on the cables 34. The illustrated hub body 28 is somewhat rectangular in shape and has a laterally oriented, shallow mounting notch, channel, or relief 53 formed into a rear surface 55, as will be described further below.

Each of the cables 34 has appropriate conductors therein (not shown) for functionally interconnecting the headset 3, the PTT switch units 5 and 6, and the transceivers 9 and 10 through a hub interconnection circuit 60 (FIG. 7) positioned within the hub body 28. The hub interconnection circuit 60 may be a printed circuit board having conductors of the cables 34 connected thereto. The circuit board 60 and proximal ends of the cables 34 may be sealingly molded into the hub body 28, with the cables 34 extending through the integrally or monolithically molded reinforcement cylinders 48 and the strain relief structures 50. The material from which the hub body 28, reinforcement cylinders 48, and strain relief structures 50 is molded is preferably an electrically nonconductive polymer which has sufficient resilience to enable the strain relief structures 50 to be pliable enough to reduce bending stresses on the cables 34 extending from the hub body 28.

Figure 5:
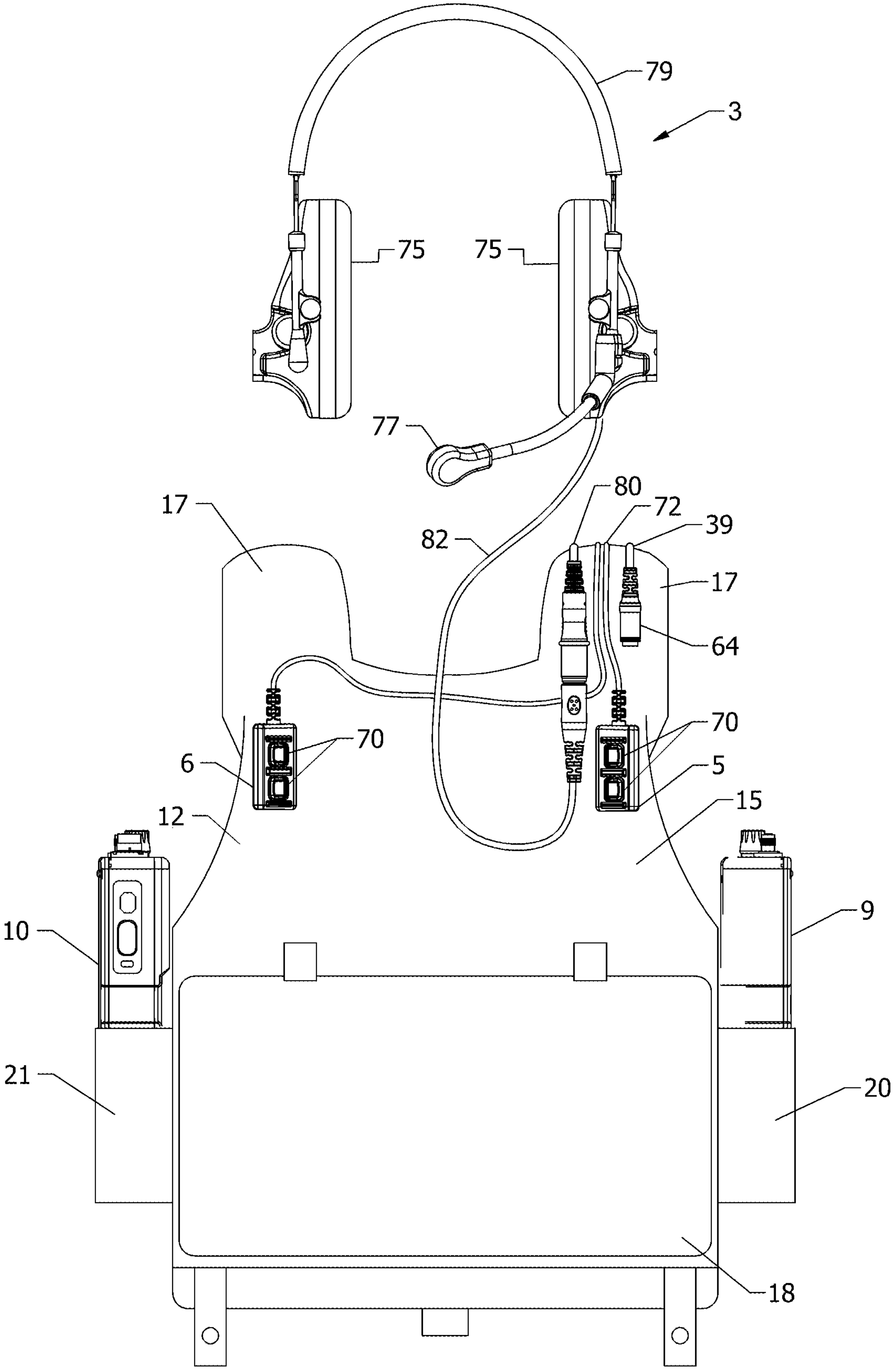
FIG. 5 is an elevational view of a front side of an exemplary tactical vest, showing communication components supported on the vest and interconnected by the hub apparatus according to the present invention.
Figure 6:
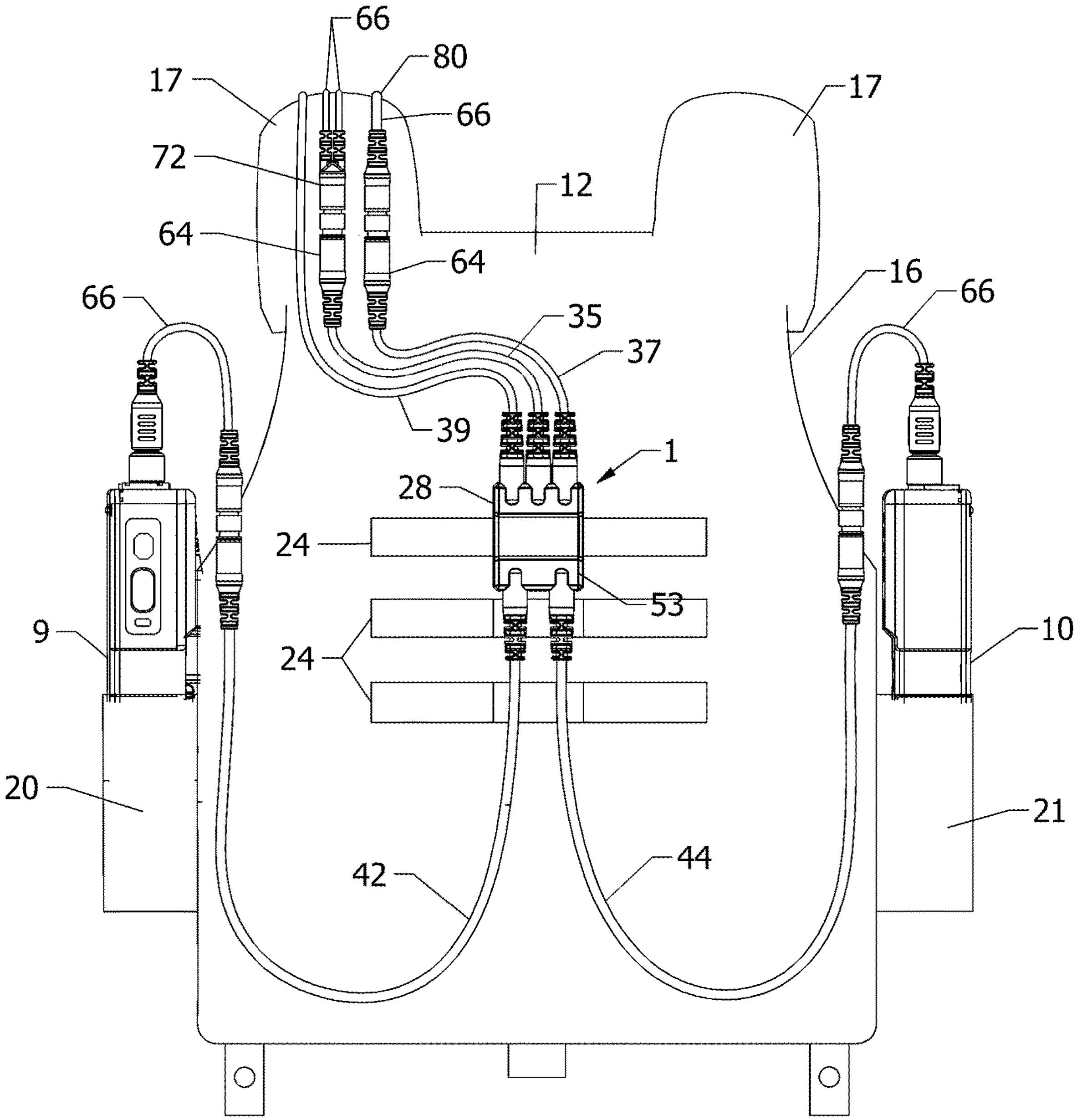
FIG. 6 is an elevational view of a rear side of the tactical vest, showing an embodiment of the hub apparatus removably secured thereto and interconnecting communication components supported on the vest.

The illustrated cables 34 terminate in cable connectors 64 (FIGS. 1, 5, and 6). It is foreseen that each of the connectors 64 may be configured to a specific requirement for the particular communication component to be interconnected by the hub apparatus 1. However, on the illustrated hub apparatus 1, the cable connectors 64 may all be identical. The cable connectors 64 are preferably of an industry standard, multiple contact type. Contacts of the connectors 64 are designated for the particular communication or control function needed. Adapter cables 66 may be connected to the cable connectors 64 and provide electrical communication between the particular contacts of the cable connectors 64 and the appropriate contacts of connectors of the switches 5 and 6, the transceivers 9 and 10, and the headset 3. Each of the cables 34, either alone or in combination with an adapter cable 66, is elongate and of sufficient length to enable positioning connectors thereof remote from the hub body 28 to enable access of such terminating connectors by the vest wearer adjacent the front panel 15 of the vest 12.

The illustrated transceivers 9 and 10 may be dual band handheld types of devices capable of operating on pluralities of programmed channels on each band and may be capable of operating in analog modes such as FM (frequency modulation), various digitally encoded audio modes, or in wideband modes. In use, the transceivers 9 and 10 are provided with appropriate antennas (not shown) for receiving and transmitting radio frequency signals. Each of the PTT units 5 and 6 is paired with one of the transceivers 9 or 10, by way of the hub apparatus 1, and has individual push-to-talk switches 70 (FIG. 5) for keying a particular band on the paired transceiver. The illustrated PTT cable 35 connects to the PTT units 5 and 6 by way of a split PTT adapter 72 (FIG. 6).

The illustrated headset 3 may be a conventional type of headset including earphones 75 and a microphone 77 mounted on an adjustable headset frame 79 for supporting the headset 3 on the head of a wearer. A headset adapter cable 80 may be provided to connect between the hub headset cable 37 and a headset cable 82 extending from the headset 3. The intercom cable 39 may be provided for connection of the headset 3, through the hub apparatus 1, to an intercom system 85 (FIG. 7) in a vehicle, such as a tank, a helicopter, or the like that does not require use of the transceivers 9 or 10.

Figure 7:
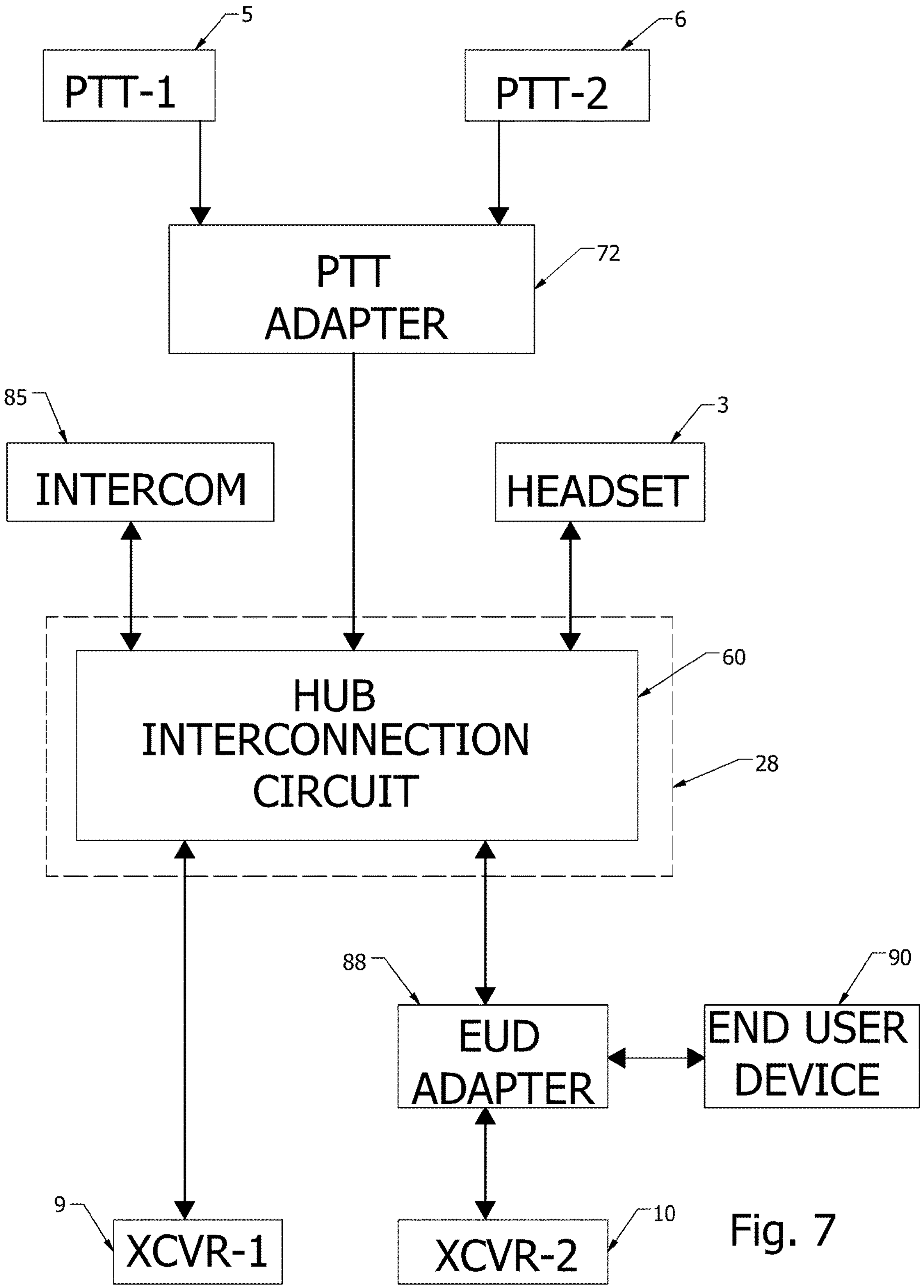
FIG. 7 is a block diagram illustrating communication components supported by a tactical vest and interconnected by the hub apparatus.

Referring to FIG. 7, an end use device (EUD) adapter 88 may be provided between the hub apparatus 1 and one or more of the transceivers 9 and 10. The illustrated EUD adapter 88 provides for connection of an end use device 90, such as a tablet computer, to the transceiver 10 to transmit and receive wideband data signals therewith. Control of the transceiver 10 for such use may be exercised by way of the end user device thereby not requiring operation of a PTT switch 70. It is foreseen that the end user device 90 could be used to play audio content received by way of the transceiver 10 through the headset 3 via the hub apparatus 1, such as an audio briefing or the like.

Figure 2:
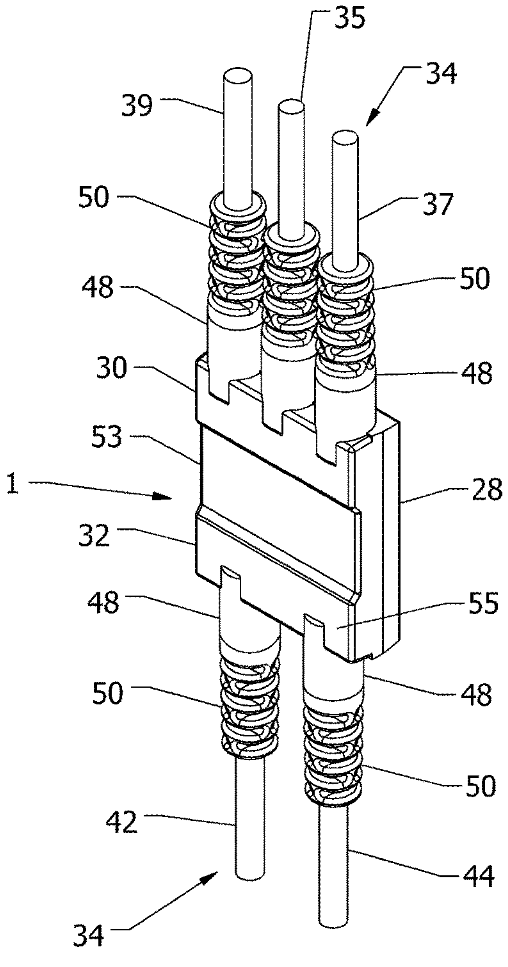
FIG. 2 is an enlarged fragmentary perspective view of the hub apparatus.
Figure 4:
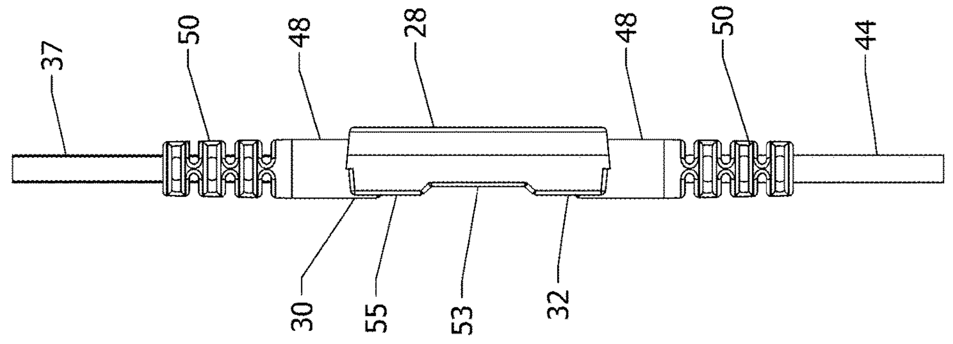
FIG. 4 is an enlarged side elevational view of the hub apparatus.
Figure 3:
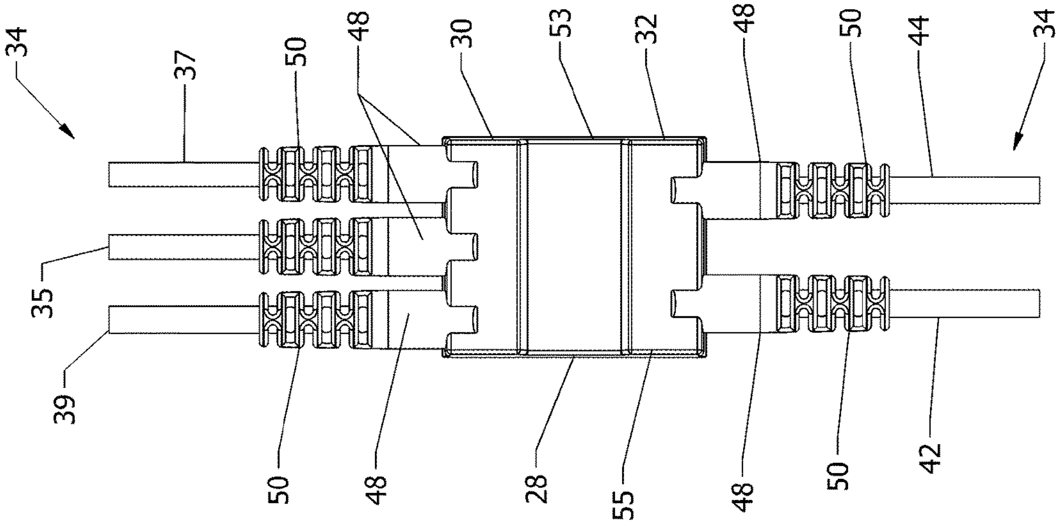
FIG. 3 is an enlarged fragmentary elevational view of the hub apparatus.

Referring to FIGS. 2 and 6, the illustrated hub apparatus 1 may be supported on the rear panel 16 of the vest 12 by slipping the hub body 28 and the cables 34 extending from one end of the hub body through one of the attachment strips 24 thereon. The notch 53 is aligned with the attachment strip 24, which slips into the notch, to removably secure the hub body 28 on the vest 12. The hub cables 34 may be routed through appropriate adapter cables 66 to transceivers 9 and 10, the headset 3, and the PTT switch units 5 and 6. The transceiver cables 42 and 44 can be routed about the rear of the vest 12 to the transceivers 9 and 10, thereby avoiding cluttering the front of the vest. The cables and adapters for the headset 3 and the PTT switch units 5 and 6 may be passed over one of the vest shoulder straps 17 to the front side of the vest 12, for access of the PTT switch units and the headset.

Figure 8:
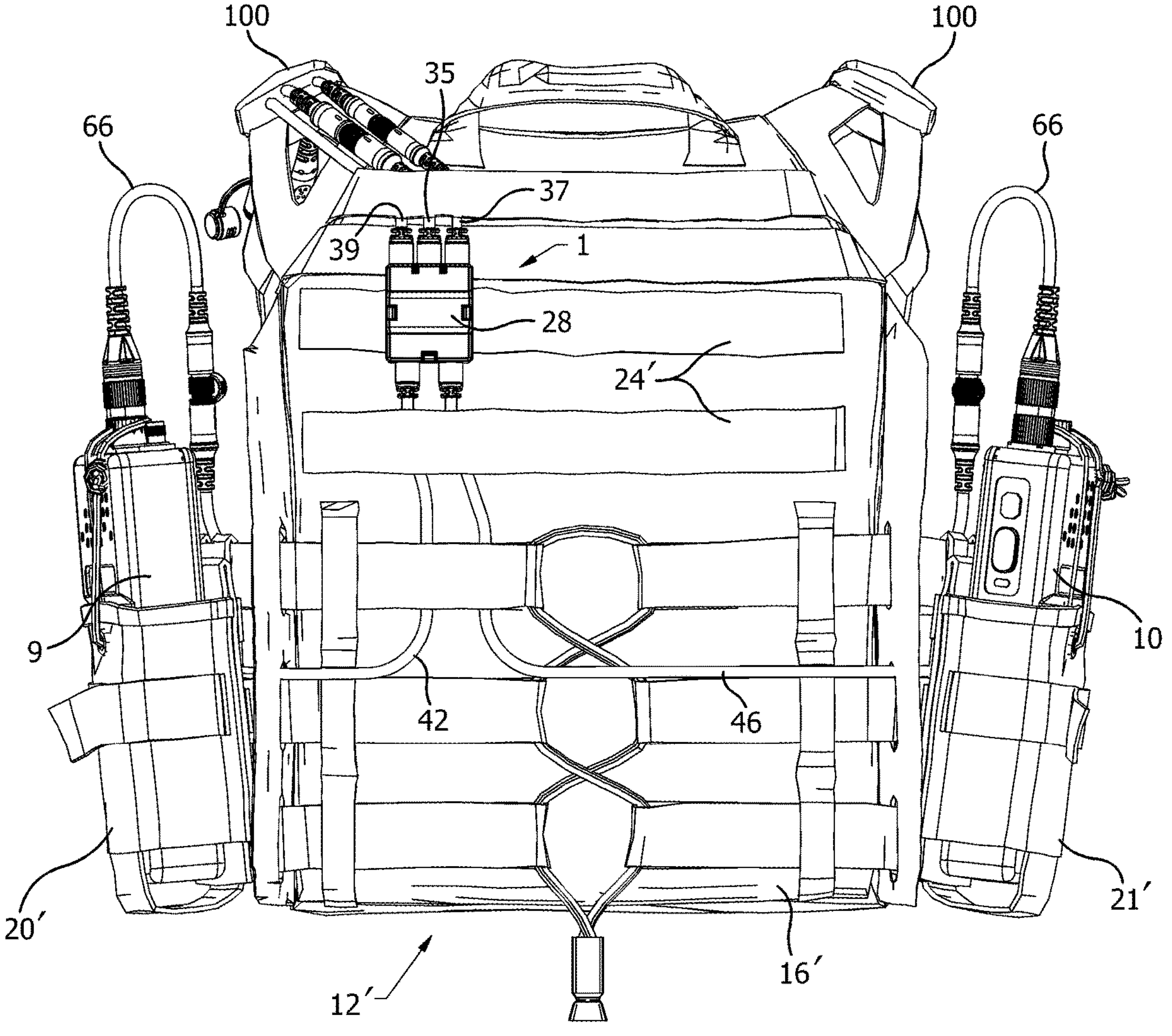
FIG. 8 is a rear elevational view of an alternative tactical vest incorporating an embodiment of the hub apparatus to interconnect communication components supported on the vest.
Figure 9:
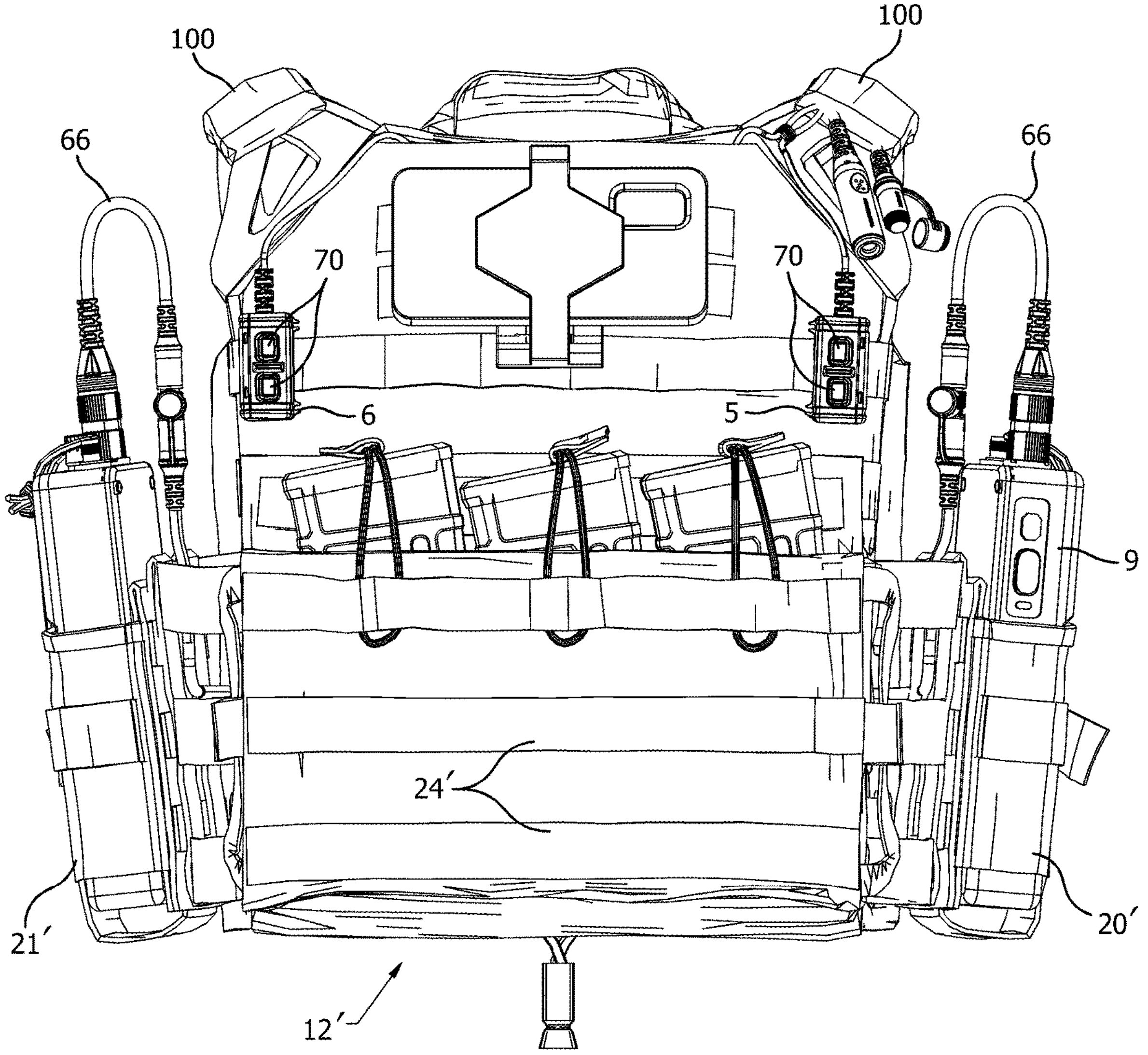
FIG. 9 is a front elevational view of the alternative tactical vest and illustrates communication components interconnected by the rear mounted hub apparatus.

FIGS. 8 and 9 illustrate an alternative embodiment of a tactical vest 12' formed by a front panel 15' (FIG. 8) and a rear panel 16' and having side pockets 20' and 21' respectively on left and right sides thereof. The front and rear panels 15' and 16' of the vest 12' have attachment strips 24' positioned thereon which may be MOLLE type attachment strips to support communication components and other tactical equipment on the vest 12'. The vest 12' may be provided with shoulder straps or epaulets 100 which extend between the front and rear panels 15' and 16'. The straps 100 may be configured to enable some of the cables 34 and/or adapter cables 66 therethrough, particularly the adapter cables 66 extending from the PTT cable 35, the headset cable 37, and the intercom cable 39. The straps 100 may be provided with hook and loop devices (not shown) to releasably retain the positions of cables extending therethrough. In other respects, the vest 12' may be functionally similar to the vest 12.

It is to be understood that while certain forms of the present invention have been illustrated and described herein, it is not to be limited to the specific forms or arrangement of parts described and shown.

What is claimed is:

1. A communications hub apparatus for interconnecting a body worn push-to-talk switch, a headset, and a portable radio transceiver and comprising:

(a) a hub housing;

(b) a headset cable extending from the housing and having respective conductors therein, the headset cable terminating in a headset cable connector;

(c) a push-to-talk cable extending from the housing and having respective conductors therein, the push-to-talk cable terminating in a push-to-talk cable connector;

(d) a transceiver cable extending directly from the housing for connection to a radio transceiver without intermediate connection through the push-to- talk switch and having respective conductors therein, the transceiver cable terminating in a transceiver cable connector;

(e) each of the cables being elongated to enable the cable connector associated therewith to be positioned relatively remote from the housing to enable access by a user to the cable connectors to provide electrical communication between contacts of the cable connectors and contacts of connectors of the push-to-talk switch, the transceiver, and the headset; and (f) a hub interconnection circuit having the respective conductors of the headset cable, the push-to-talk cable, and the transceiver cable connected thereto, wherein the hub interconnection circuit is configured to provide separate signal paths between the headset, the push-to-talk switch, and the radio transceiver, respectively, and is further configured to interconnect conductors of the push-to-talk, headset, and transceiver cables in such a manner that a push-to-talk switch is paired with a transceiver via the hub interconnection circuit and operation of the push-to-talk switch connected to the push-to-talk cable connector causes cooperation of a headset connected to the headset cable connector with the transceiver connected to the transceiver cable connector to transmit and receive radio communications by way of the transceiver, wherein the headset, the push-to-talk switch, and the transceiver are each independently positionable relatively remote from the housing and wherein the headset cable, the push-to-talk cable, and the transceiver cable each extend separately and directly from the hub housing without passing through another one of the push-to-talk switch, the headset, and the transceiver.

2. The communications hub apparatus as set forth in claim 1 wherein:

(a) the conductors of the push-to-talk cable are connected to the push-to-talk connector which is configured to enable a pair of push-to-talk switches to be connected thereto;

(b) a pair of transceiver cables extend from the housing, each transceiver cable including respective conductors therein and terminating in a respective transceiver connector to enable a respective one of a pair of transceivers to be connected thereto; and (c) the interconnection circuit has the conductors of the push-to-talk cable and the transceiver cables interconnected therewith and is configured in such a manner as to enable operation of a selected transceiver in cooperation with a headset by operation of a push-to-talk switch associated with the selected transceiver.

3. The communications hub apparatus as set forth in claim 1 wherein the housing includes:

(a) a strain relief structure surrounding each of the cables where the cables exit the housing.

4. The communications hub apparatus as set forth in claim 1 wherein the housing includes:

(a) a surface feature formed in a surface thereof to enable secure removable mounting of the housing on existing attachment structure of a tactical vest.

5. The communications hub apparatus as set forth in claim 1 wherein the housing includes:

(a) a notch formed in a surface thereof to enable secure removable mounting of the housing on an existing attachment structure of a tactical vest.

6. The communications hub apparatus as set forth in claim 1 in combination with:

(a) a tactical vest having a rear panel with attachment structure thereon; and (b) the housing being removably attached to attachment structure on the rear panel of the vest.

7. The communications hub apparatus as set forth in claim 1 in combination with:

(a) a tactical vest having a front panel and having a rear panel with attachment structure thereon;

(b) the housing being removably attached to attachment structure on the rear panel of the vest;

(c) at least one of the cables including an elongated adapter cable connected to the connector thereof and terminating in an adapter cable connector;

(d) each of the cables without an adapter cable having a length sufficient to enable access to the connector associated therewith adjacent the front panel of the vest; and (e) a cable with an adapter cable having a combined length sufficient to enable access to the adapter cable connector adjacent the front panel of the vest.

8. The communications hub apparatus as set forth in claim 1 wherein the housing includes:

(a) a molded hub body having the hub interconnection circuit, proximal ends of the push-to-talk, headset, and transceiver cables, and connections of conductors of the cables to the interconnection circuit sealingly molded therein.

9. The communications hub apparatus as set forth in claim 1 wherein the hub housing includes:

(a) a molded hub body formed of a somewhat resilient, electrically nonconductive polymer; and (b) the hub body having the hub interconnection circuit, a proximal end of the push-to-talk cable, a proximal end of the headset cable, and a proximal end of the transceiver cables, and connections of conductors of the cables to the hub interconnection circuit sealingly molded therein.

10. A communications hub apparatus for interconnecting body worn push-to-talk switches, a headset, and a pair of body worn portable radio transceivers and comprising:

(a) a hub housing;

(b) a headset cable extending from the housing and having headset conductors therein, the headset cable terminating in a headset cable connector having the headset conductors connected thereto;

(c) a push-to-talk cable extending from the housing and having sets of push-to-talk conductors therein which are associated respectively with a pair of transceivers, the push-to-talk cable terminating in a push-to-talk cable connector having the push-to-talk conductors connected thereto, the push-to-talk cable connector being configured to enable at least a pair of push-to-talk switches to be connected thereto which are associated respectively with a pair of transceivers;

(d) a pair of transceiver cables each extending directly from the housing for connection to a respective radio transceiver without intermediate connection through a push-to-talk switch, each of the transceiver cables having transceiver conductors therein which are associated with one of a pair of transceivers, each of the transceiver cables terminating in a respective transceiver cable connector having the associated transceiver conductors connected thereto;

(e) a proximal end of the push-to-talk cable, a proximal end of the headset cable, and a proximal end of each of the pair of transceiver cables, and connections of the conductors of the push to talk cable, the headset cable, and the transceiver cables to a hub interconnection circuit sealingly molded within the housing, and each of the headset cable, the push-to-talk cable and the pair of transceiver cables being elongated to enable the respective headset cable connector, the push-to-talk cable connector and the transceiver cable connectors associated therewith to be positioned relatively remote from the housing to enable access by a user to the cable connectors to provide electrical communication between contacts of the cable connectors and contacts of connectors of the push-to-talk switches, the headset, and the pair of transceivers; and (f) the hub interconnection circuit having the conductors of the headset cable, the push-to-talk cable, and the transceiver cables connected thereto, the hub interconnection circuit being configured to interconnect conductors of the push-to-talk, headset, and transceiver cables in such a manner that each of the pair of push-to-talk switches is paired with one of the pair of transceivers via the hub interconnection circuit and operation of a selected push-to-talk switch connected to the push-to-talk cable connector causes cooperation of a headset connected to the headset cable connector with a transceiver connected to a transceiver cable connector associated with the selected push-to-talk switch operated to thereby transmit and receive radio communications by way of the respective transceiver, wherein the headset, each of the pair of push-to-talk switches, and each of the pair of transceivers are independently positionable relatively remote from the housing, wherein the hub interconnection circuit is configured to selectively couple the headset to either one of the pair of transceivers in response to activation of the respective push-to-talk switch and wherein each of the headset cable, the push-to-talk cable, and the pair of transceiver cables extend separately and directly from the hub housing without passing through another one of the push-to-talk switches, the headset, and the pair of transceivers.

11. The communications hub apparatus as set forth in claim 10 wherein the housing includes:

(a) a strain relief structure surrounding each of the cables where the cables exit the housing.

12. The communications hub apparatus as set forth in claim 10 wherein the housing includes:

(a) a surface feature formed in a surface thereof to enable secure removable mounting of the housing on existing attachment structure of a tactical vest.

13. The communications hub apparatus as set forth in claim 10 wherein the housing includes:

(a) a notch formed in a surface thereof to enable secure removable mounting of the housing on existing attachment structure of a tactical vest.

14. The communications hub apparatus as set forth in claim 10 in combination with:

(a) a tactical vest having a rear panel with attachment structure thereon; and (b) the housing is removably attached to attachment structure on the rear panel of the vest.

15. The communications hub apparatus as set forth in claim 10 in combination with:

(a) a tactical vest having a front panel and having a rear panel with attachment structure thereon;

(b) the housing being removably attached to attachment structure on the rear panel of the vest;

(c) at least one of the cables including an elongated adapter cable connected to the connector thereof and terminating in an adapter cable connector;

(d) each of the cables without an adapter cable having a length sufficient to enable access to the connector associated therewith adjacent the front panel of the vest; and (e) a cable with an adapter cable having a combined length sufficient to enable access to the adapter cable connector adjacent the front panel of the vest.

16. The communications hub apparatus as set forth in claim 10 wherein the housing includes:

(a) a molded hub body having the hub interconnection circuit.

17. The communications hub apparatus as set forth in claim 10 wherein the hub housing includes:

(a) a molded hub body formed of a somewhat resilient, electrically nonconductive polymer; and (b) the molded hub body having the hub interconnection circuit.

18. The communications hub apparatus as set forth in claim 10 in combination with:

(a) a cable adapter connected between at least one of the cable connectors and at least one of a push-to-talk switch, a headset, and a transceiver.

19. A communications hub apparatus for interconnecting body worn push-to-talk switches, a headset, and a pair of body worn portable radio transceivers and comprising:

(a) a tactical vest having a rear panel with an attachment structure thereon configured for supporting equipment on the vest;

(b) a hub housing configured to be removably attached to and supported by the attachment structure on the rear panel of the vest such that the hub housing is positioned on the rear panel behind the wearer during use;

(c) a headset cable having headset conductors therein, a first end of the headset cable extending from the housing, the headset cable terminating in a headset cable connector at a second end thereof, and the headset cable connector having the headset conductors connected thereto;

(d) a push-to-talk cable having sets of push-to-talk conductors therein, a first end of the push-to-talk cable extending from the housing, the push-to-talk cable terminating in a push-to-talk cable connector at a second end thereof, the push-to-talk cable connector having the push-to-talk conductors connected thereto, and the push-to-talk cable connector being configured to enable a plurality of push-to-talk switches to be connected thereto, each push-to-talk switch associated with a respective transceiver;

(e) a plurality of transceiver cables each having a respective set transceiver conductors therein, a first end of each of the transceiver cables extending from the housing, each of the transceiver cables terminating in a respective transceiver cable connector at a second end thereof, each transceiver cable connector having the respective set of transceiver conductors of the transceiver cable connected thereto, and each of the transceiver cables associated with a respective transceiver, wherein each transceiver cable extends directly from the housing to the respective radio transceiver without intermediate connection through a push-to-talk switch;

(f) each of the headset cable, the push-to-talk cable and the plurality of transceiver cables being elongated to enable the respective headset cable connector, the push-to-talk cable connector, and the transceiver cable connectors associated therewith to be positioned relatively remote from the housing supported on the rear panel of the vest to enable access of the connectors positioned adjacent a front panel of the vest by the wearer thereof to provide electrical communication between contacts of the connectors and contacts of connectors of the headset, the push-to-talk switches, and the pair of transceivers; and (g) a hub interconnection circuit housed within the hub housing and having the conductors of the headset cable, the push-to-talk cable, and the plurality of transceiver cables connected thereto, the hub interconnection circuit being configured to interconnect conductors of the push-to-talk cable, the headset cable, and the plurality of transceiver cables in such a manner that operation of a selected push-to-talk switch connected to the push-to-talk cable connector causes cooperation of a headset connected to the headset cable connector and a transceiver connected to an associated transceiver cable connector and associated with the selected push-to-talk switch operated to thereby transmit and receive radio communications by way of the respective transceiver, wherein the headset cable and the plurality of transceiver cables extend from the hub housing supported on the rear panel of the vest toward communication devices positioned adjacent the front panel of the vest.

* * * * *